J. R. Swann,
Steam Safety Valve,
№ 62,163. Patented Feb. 19, 1867.
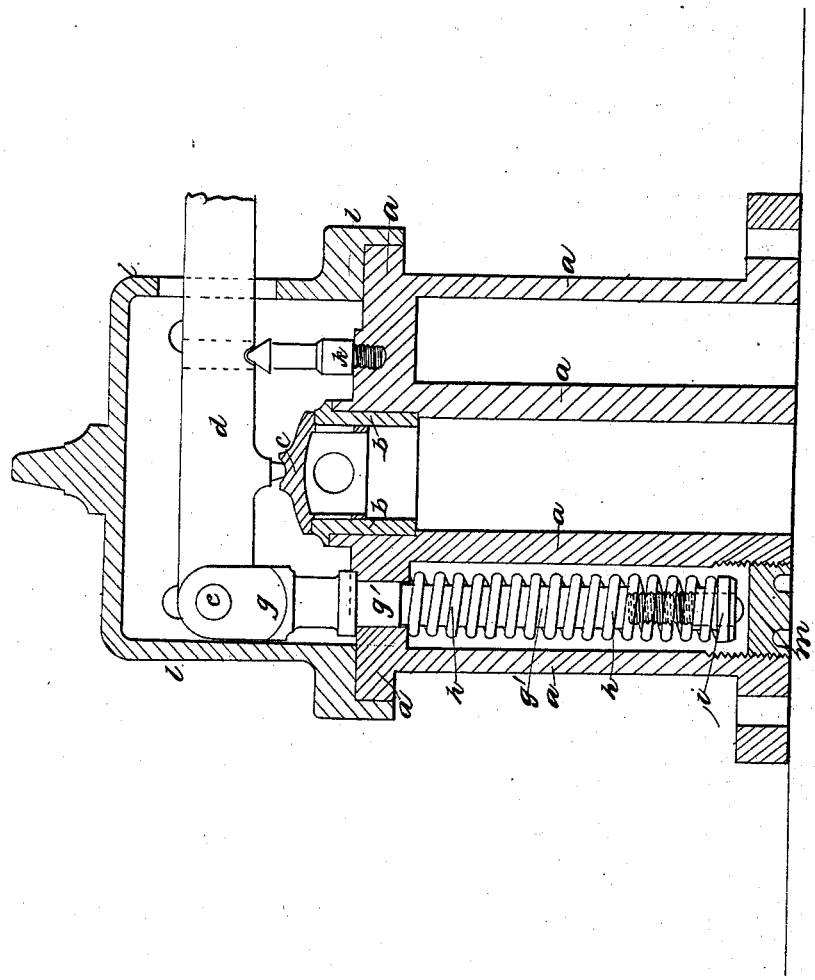
Witnesses:
Geo Grier
Ja Marshall
Inventor:
J R Swann

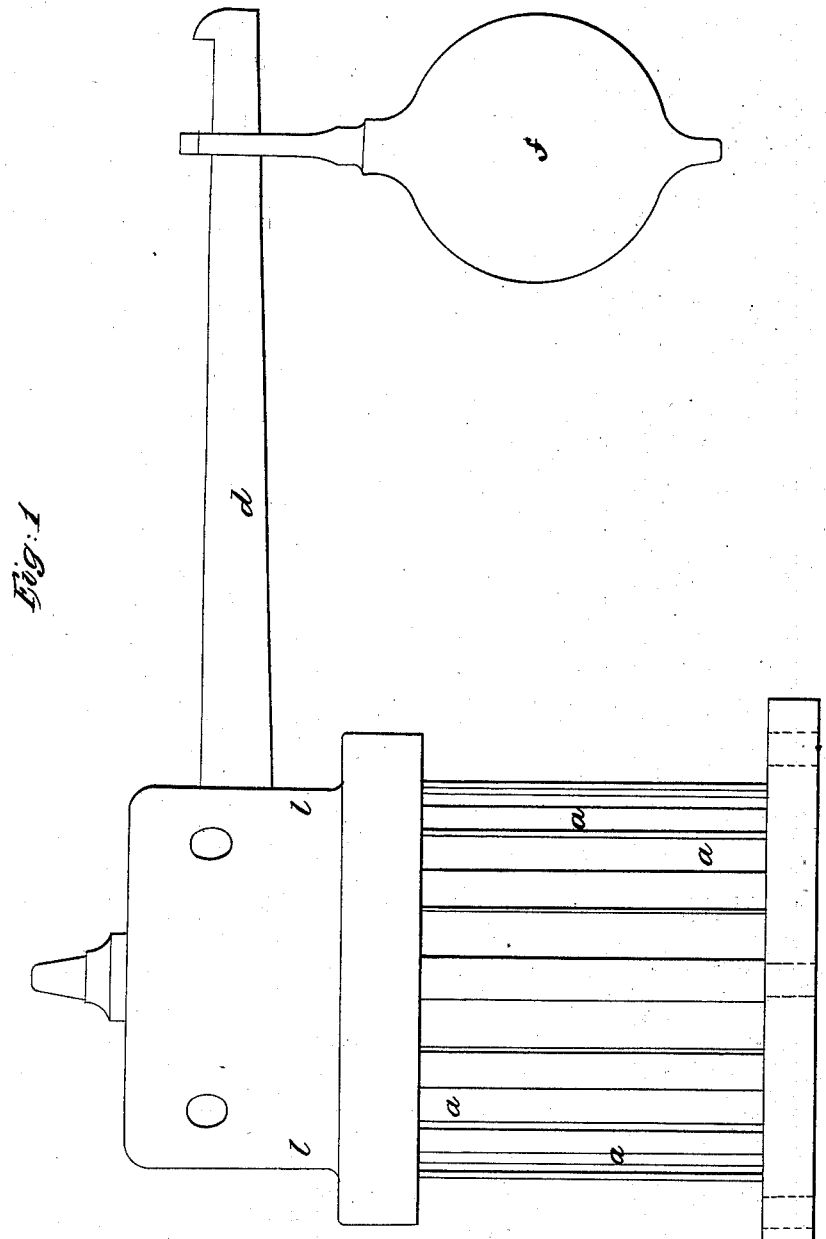

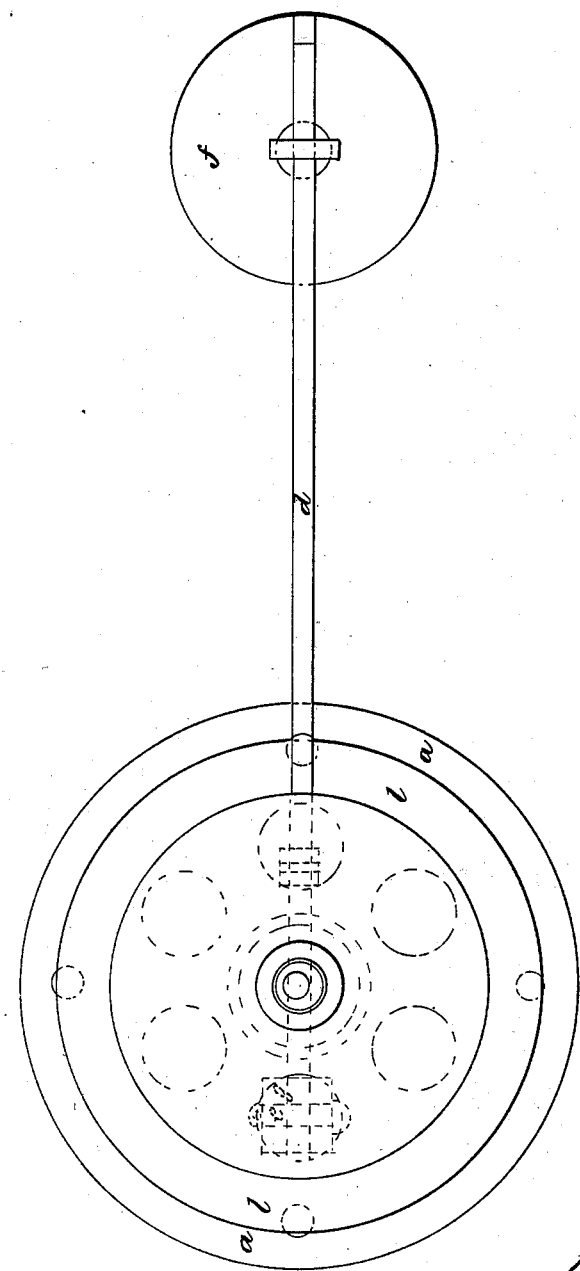

United States Patent Office.

JOHN RUSSELL SWANN, OF EDINBURGH, SCOTLAND.

Letters Patent No. 62,163, dated February 19, 1867.

---

IMPROVEMENT IN SAFETY VALVES.

---

The Schedule referred to in these Letters Patent and making part of the same.

---

TO ALL TO WHOM IT MAY CONCERN:

Be it known that I, JOHN RUSSELL SWANN, of Windsor Cottage, Montgomery street, Edinburgh, Scotland, have invented or discovered new and useful "Improvements in Safety Valves;" and I, the said JOHN RUSSELL SWANN, do hereby declare the nature of the said invention and in what manner the same is to be performed to be particularly described and ascertained in and by the following statement thereof; that is to say—

This invention has for its object improvements in safety valves. Very many accidents to steam boilers at present occur in consequence simply of an undue weight being applied to the lever of the safety valve. Now, according to my invention, I so arrange the apparatus that an undue weight applied to the lever of the valve, in place of allowing an increase of pressure in the boiler, will cause the steam to blow off at any pressure to which the apparatus may be set. In place of arranging the valve-lever to turn on a fixed centre or axis, as is usual, I arrange the centre or axis in such manner that it is kept down only by a spring or weight, which yields when undue pressure is applied at the other end of the lever. The outer arm of the lever then descends a short distance till it comes against a fulcrum arranged for it between the valve and the weight, and then the undue weight applied to the lever aids in taking pressure from the valve. The inner end of the lever, with its centre or axis, is cased in so that it cannot be tampered with. The same arrangement is applicable where an adjustable spring is applied to the outer end of the valve-rod in place of a sliding weight. And in order that my said invention may be most fully understood and readily carried into effect, I will proceed to describe the drawings hereunto annexed.

Description of the Drawings.

Figure 1 is a side view.
Figure 2 is a plan; and
Figure 3, a vertical section of a safety valve constructed according to my invention.

$a\ a$ is a casting, which is secured by bolts to the top of the steam chest. $b$ is a bushing of brass fitted into it to form the valve-seat. $c$ is the valve; it is held down by the weight lever $d$, which turns at one end on the pin $e$ and at the other receives the sliding weight $f$, and by sliding this weight on the lever $d$ the pressure on the valve may be varied as desired. $g$ is the fulcrum, to which the lever $d$ is jointed by the pin $e$; and this fulcrum, according to my invention, is made so as to yield when a heavy pressure is put upon it. Its stem, $g'$, drops into a socket bored to fit it in the casting $a$, and in a space within this casting the stem $g'$ receives the spiral spring $h$, which is retained by the nut $i$ on the stem, so that, as will be seen, by screwing up the nut $i$ the fulcrum $g$ may be held down in its socket with any desired force. A convenient way of adjusting the spring $h$ is to place a suitable weight, $f$, at the end of the lever and to screw up the spring until its tension is just sufficient to hold down the fulcrum $g$. $k$ is a stud fixed in the casting $a$ in such a position that, as soon as the fulcrum $g$ commences to yield in consequence of an excessive weight being applied to the lever $d$, the said lever may come down on to the stud, which then acts as a new fulcrum, and the excessive weight applied then assists the pressure of the steam in lifting the valve. $l$ is a cover, with openings in it for the passage of the lever $d$ and for the escape of the steam. It is secured by screws or otherwise to the casting $a$, so that the valve may not be tampered with. $m$ is a screw-plug, which closes the recess in the casting $a$, in which the spiral spring is contained.

What I claim as my invention, and desire to secure by Letters Patent, is—

The combination and arrangement of the spring $h$ and stud $k$ with the lever $d$, fulcrum $g$, and its stem $g'$, substantially as described.

J. R. SWANN.

Witnesses:
GEO. GRIER, of No. 15 Dublin Street, Edinburgh, Clerk,
JAS. MARSHALL, of No. 130 Princes Street, Edinburgh, Law Apprentice.